United States Patent
Wegelin

(10) Patent No.: US 12,147,203 B2
(45) Date of Patent: *Nov. 19, 2024

(54) METHOD FOR OPERATING A FLUID DISPENSER HAVING FLUID STORED THEREIN

(71) Applicant: GOJO Industries, Inc., Akron, OH (US)

(72) Inventor: Jackson W. Wegelin, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 469 days.

This patent is subject to a terminal disclaimer.

(21) Appl. No.: 17/515,980

(22) Filed: Nov. 1, 2021

(65) Prior Publication Data

US 2022/0057763 A1    Feb. 24, 2022

Related U.S. Application Data

(63) Continuation of application No. 16/518,125, filed on Jul. 22, 2019, now Pat. No. 11,163,276, which is a continuation of application No. 15/000,180, filed on Jan. 19, 2016, now Pat. No. 10,359,744.

(60) Provisional application No. 62/108,785, filed on Jan. 28, 2015.

(51) Int. Cl.
    *G05B 15/02*    (2006.01)
    *A47K 5/12*     (2006.01)

(52) U.S. Cl.
    CPC ............ *G05B 15/02* (2013.01); *A47K 5/1217* (2013.01); *A47K 5/1207* (2013.01)

(58) Field of Classification Search
    CPC ..... A47K 5/1217; A47K 5/1207; G05B 15/02
    USPC .......................................... 700/283
    See application file for complete search history.

(56) References Cited

U.S. PATENT DOCUMENTS

| | | | | |
|---|---|---|---|---|
| 2004/0074921 A1* | 4/2004 | Lips | ..................... | A01C 23/042 222/52 |
| 2007/0009365 A1* | 1/2007 | Litterst | ................ | B67D 1/1231 417/44.1 |
| 2010/0256825 A1* | 10/2010 | Nielsen | ................... | B05B 12/12 700/283 |
| 2012/0191476 A1* | 7/2012 | Reid | ..................... | G16H 10/65 705/3 |

(Continued)

*Primary Examiner* — Darrin D Dunn
*Assistant Examiner* — Marzia T Monty
(74) *Attorney, Agent, or Firm* — Cooper Legal Group, LLC

(57) ABSTRACT

A method for operating a fluid dispenser is provided. The method includes receiving, by the fluid dispenser, an interrogation signal from a remote electronic device, and in response to receiving the interrogation signal, transmitting, by the fluid dispenser and to the remote electronic device, an identification of a fluid type of the fluid stored within the fluid dispenser. The method further includes dispensing fluid from the fluid dispenser in response to an actuation request and based upon a fluid-specific setting received from the remote electronic device. A method for programming a fluid dispenser is also provided. The method includes detecting, by a remote electronic device, a fluid type of a fluid stored within the fluid dispenser, and transmitting one of a first fluid-specific setting and a second fluid-specific setting to the fluid dispenser based upon a detected fluid type of fluid stored within the fluid dispenser.

20 Claims, 8 Drawing Sheets

(56) References Cited

U.S. PATENT DOCUMENTS

| | | | | |
|---|---|---|---|---|
| 2012/0245729 A1* | 9/2012 | Wegelin | ................ | G01F 15/068 700/231 |
| 2014/0336828 A1* | 11/2014 | Gromes, Sr. | ........ | G06F 3/04886 700/282 |
| 2015/0346701 A1* | 12/2015 | Gordon | ............... | H04L 12/2809 700/275 |

* cited by examiner

METHOD FOR OPERATING A FLUID DISPENSER HAVING FLUID STORED THEREIN

CROSS-REFERENCE TO RELATED APPLICATIONS

This application is a continuation of and claims priority to U.S. Non-Provisional patent application Ser. No. 16/518,125, filed on Jul. 22, 2019, which claims priority to U.S. Non-Provisional patent application Ser. No. 15/000,180, filed on Jan. 19, 2016, which claims priority to U.S. Provisional Patent Application No. 62/108,785, filed on Jan. 28, 2015. The entire disclosures of U.S. Non-Provisional patent application Ser. No. 16/518,125, U.S. Non-Provisional patent application Ser. No. 15/000,180, and U.S. Provisional Patent Application No. 62/108,785 are hereby incorporated by reference.

TECHNICAL FIELD

A fluid dispenser is programmable from a remote computing device.

BACKGROUND

Conventional fluid dispensers can have features that are programmable from a remote computing device.

SUMMARY

In accordance with one embodiment, a method is provided for operating a fluid dispenser having fluid stored therein. The method comprises transmitting, by the fluid dispenser and to a first remote electronic device, an identification of a fluid type of the fluid stored within the fluid dispenser. The method further comprises receiving, by the fluid dispenser and from the first remote electronic device, a fluid-specific setting based upon the fluid type, and receiving, by the fluid dispenser, an actuation request. The method further comprises dispensing fluid from the fluid dispenser in response to the actuation request and based upon the fluid-specific setting received from the first remote electronic device. The fluid-specific setting is assigned by a user at the first remote electronic device and designated for transmission to the fluid dispenser from among a plurality of fluid-specific settings. Each fluid-specific setting of the plurality of fluid-specific settings is for a different fluid type.

In accordance with another embodiment, a method is provided for programming a fluid dispenser. The method comprises receiving, by a remote electronic device, a first input from a user indicative of a first fluid-specific setting for a first fluid type, and receiving, by the remote electronic device, a second input from the user indicative of a second fluid-specific setting for a second fluid type. The method further comprises detecting, by the remote electronic device, a fluid type of a fluid stored within the fluid dispenser, and transmitting one of the first fluid-specific setting and the second fluid-specific setting to the fluid dispenser based upon the detected fluid type of the fluid stored within the fluid dispenser. The first fluid type and the second fluid type are different.

In accordance with yet another embodiment, a method is provided for operating a fluid dispenser having a dispensation port. The method comprises receiving a first fluid into the fluid dispenser for selective dispensation from the dispensation port, and receiving, by the fluid dispenser, an interrogation signal from a remote electronic device. The method further comprises in response to receiving the interrogation signal, transmitting, by the fluid dispenser and to the remote electronic device, an identification of the first fluid stored within the fluid dispenser, and receiving, by the fluid dispenser and from the remote electronic device, a first dosage amount setting for the first fluid. The method still further comprises dispensing, by the fluid dispenser, a first amount of fluid from the fluid dispenser based upon the first dosage amount setting, and receiving, by the fluid dispenser, a second fluid into the fluid dispenser for selective dispensation from the dispensation port. The method yet further comprises receiving, by the fluid dispenser, another interrogation signal from the remote electronic device, and in response to receiving the another interrogation signal, transmitting, by the fluid dispenser and to the remote electronic device, an identification of the second fluid stored within the fluid dispenser. The method further comprises receiving, by the fluid dispenser and from the remote electronic device, a second dosage amount setting for the second fluid, and dispensing, by the fluid dispenser, a second amount of fluid from the fluid dispenser based upon the second dosage amount setting for the second fluid. The first dosage amount setting and the second dosage amount setting are assigned by a user via the remote electronic device and designated for transmission to the fluid dispenser from among a plurality of dosage amount settings for other fluids. The first fluid and the second fluid are different.

BRIEF DESCRIPTION OF THE DRAWINGS

Various embodiments will become better understood with regard to the following description, appended claims and accompanying drawings wherein:

DETAILED DESCRIPTION

Figure 1:
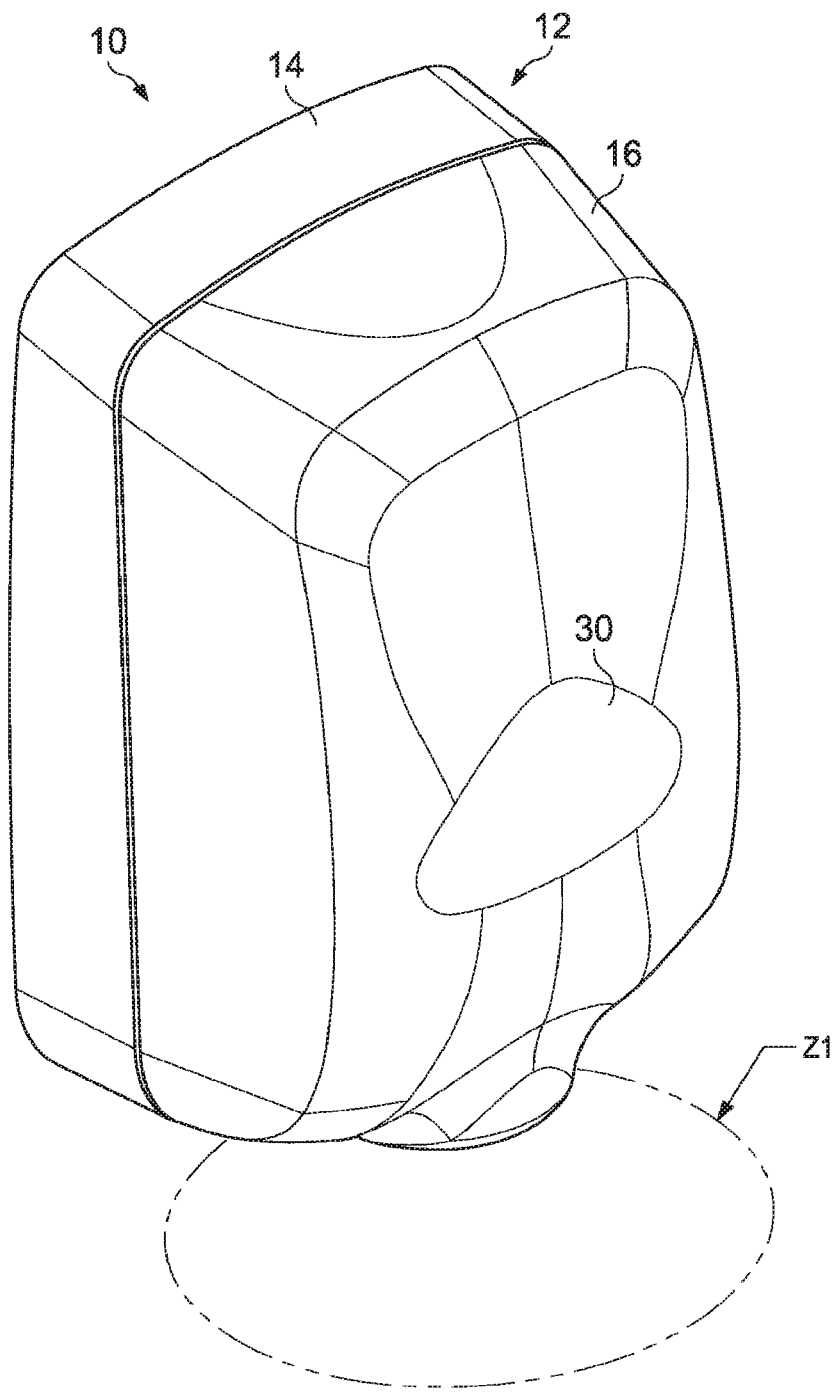
FIG. 1 is perspective view depicting a fluid dispenser, with a lid of the fluid dispenser shown in a closed position.
Figure 2:
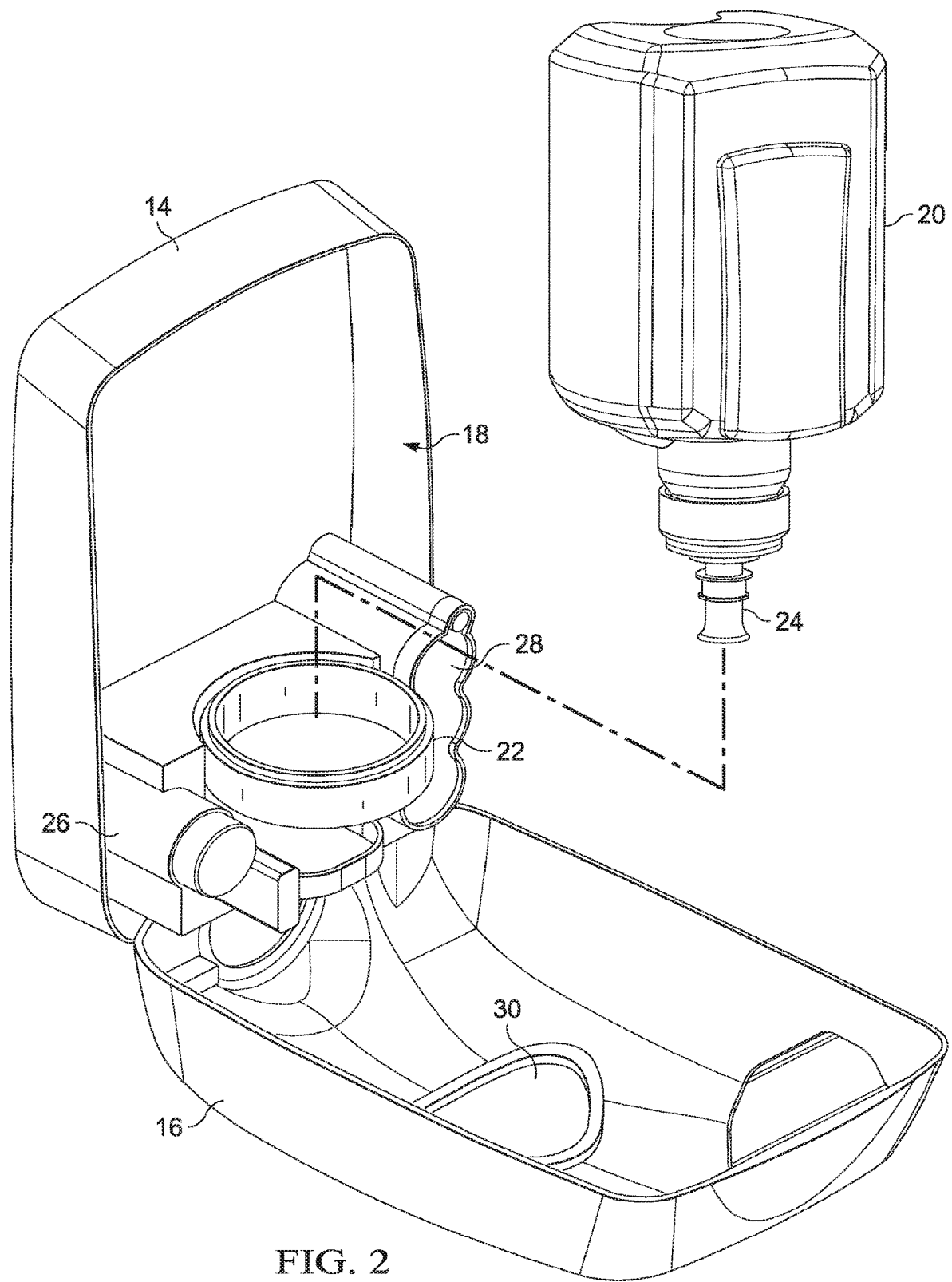
FIG. 2 is a front perspective view depicting the fluid dispenser of FIG. 1, but with the lid of the fluid dispenser being shown in an open position.

Embodiments are hereinafter described in detail in connection with the views of FIGS. 1-8, wherein like numbers indicate the same or corresponding elements throughout the views. FIGS. 1-2 illustrate a fluid dispenser 10 which can dispense a variety of different types of fluids or liquids, such as, for example, soap, sanitizer, soil removing cleaner, lotion, shampoo, or conditioner, to the hands of a user. The fluid dispenser 10 can include a housing 12 that includes a base 14 and lid 16. The base 14 and the lid 16 can cooperate to define an interior chamber 18 which can house various components of the fluid dispenser 10, and can be configured to receive a fluid container 20. The fluid container 20 can contain a fluid or liquid to be dispensed from the fluid dispenser 10, onto the hands of a user. The lid 16 can be pivotable with respect to the base 14, as illustrated in FIG. 2, to reveal the interior chamber 18 to allow for replacement of the fluid container 20.

Referring now to FIG. 2, the fluid dispenser 10 can include a collar 22 that can receive a dispensation port 24 of the fluid container 20. The fluid dispenser 10 can also include a motor 26 and batteries 28 for powering the motor 26. With the fluid container 20 installed on the collar 22, the motor 26 can actuate a pump (not shown) to facilitate dispensation of fluid onto a user's hands below. The fluid dispenser 10 can include a proximity sensor (not shown) or other detection device that defines a detection zone Z1 (FIG. 1). A user can indicate a request for actuation of the fluid dispenser 10 by placing their hands (or other object) within the detection zone Z1, which can initiate operation of the motor 26 to dispense fluid onto the user's hands. In an alternative embodiment, a user can request actuation of the fluid dispenser 10 by manually actuating a push bar (not shown) that facilitates dispensation of fluid onto a user's hands.

As shown in FIGS. 1 and 2, the lid 16 can define a viewing window 30, which can facilitate viewing into the interior chamber 18 defined by the base 14 and lid 16, for example, to determine whether the fluid container 20 is disposed within the fluid dispenser 10 and/or to determine the fill level of the fluid container 20.

Figure 3:
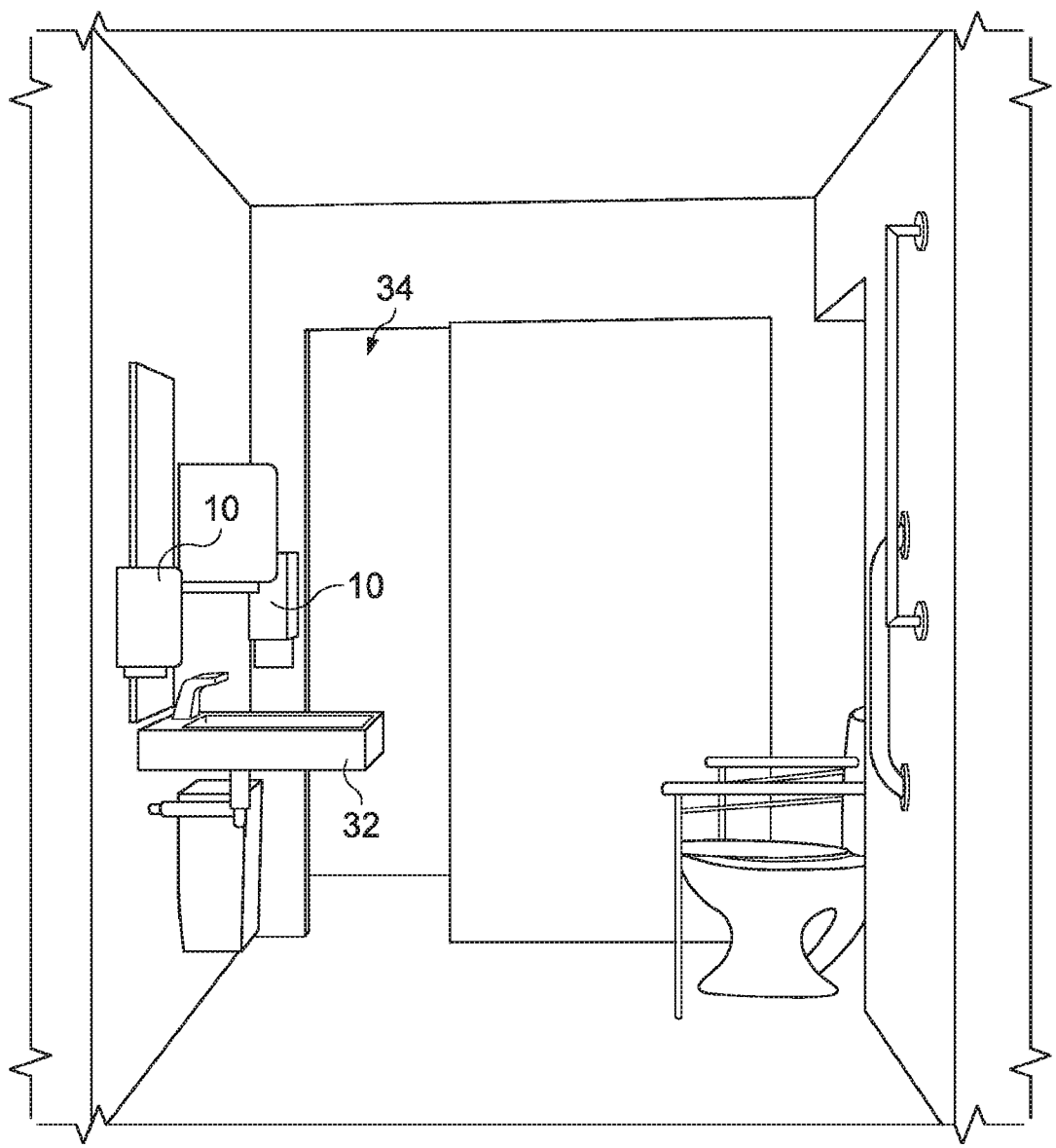
FIG. 3 is an environmental view depicting a restroom having a pair of the fluid dispensers of FIG. 1 mounted therein.

Referring now to FIG. 3, two fluid dispensers 10 are shown to be provided in a restroom for sanitizing a user's hands. One of the fluid dispensers 10 can be placed adjacent to a sink 32 and can dispense soap or other fluid for a user washing her hands in the sink 32. The other fluid dispenser 10 can be provided adjacent to a doorway 34 and can dispense sanitizer or other fluid to anyone entering/exiting the bathroom (e.g., health care provider, patient, visitor, etc.). Although the fluid dispensers 10 are shown in FIG. 3 to be wall-mounted, a fluid dispenser 10 can be mounted at any of a variety of other locations (e.g., sink mounted, mirror mounted, etc.).

It is to be appreciated that the fluid container 20 can be filled with any of a variety of different fluid types. The different fluid types can have different formulations, different flow rates, different delivery forms (e.g., foam vs. gel) or any of a variety of other different characteristics. Some example fluid types include a foam hand sanitizer having about 70% weight/weight (w/w) concentration of ethanol, a gel hand sanitizer having about 70% w/w concentration of ethanol, a gel (e.g., lotion) soap, a foam soap, a hair shampoo, a conditioner, a solvent-based soil removing cleaner having grit (e.g., pumice) particles, and a solvent-based soil removing cleaner that is devoid of grit particles. In some embodiments, the fluid type for the fluid dispenser 10 can be readily interchanged by installing different fluid containers (e.g., the fluid container(s) 20) onto the fluid dispenser 10. The particular fluid type can be selected based on the environment into which the fluid dispenser 10 is installed (e.g., soil removing cleaner for vehicle repair shop or hair conditioner for a shower in a locker room). The configuration of the fluid dispenser 10 can also be selected based upon the fluid type (e.g., in order to facilitate effective delivery of the fluid from the fluid dispenser 10).

The amount of fluid dispensed from the fluid dispenser 10 for each actuation of the pump (e.g., the dosage amount) can be selectively varied. In one embodiment, the dosage amount can be varied by changing the duty cycle of the motor 26. In another embodiment, the dosage amount can be varied by varying the throughput of the dispensation port 24 (e.g., with a variable valve, not shown).

Figure 4:
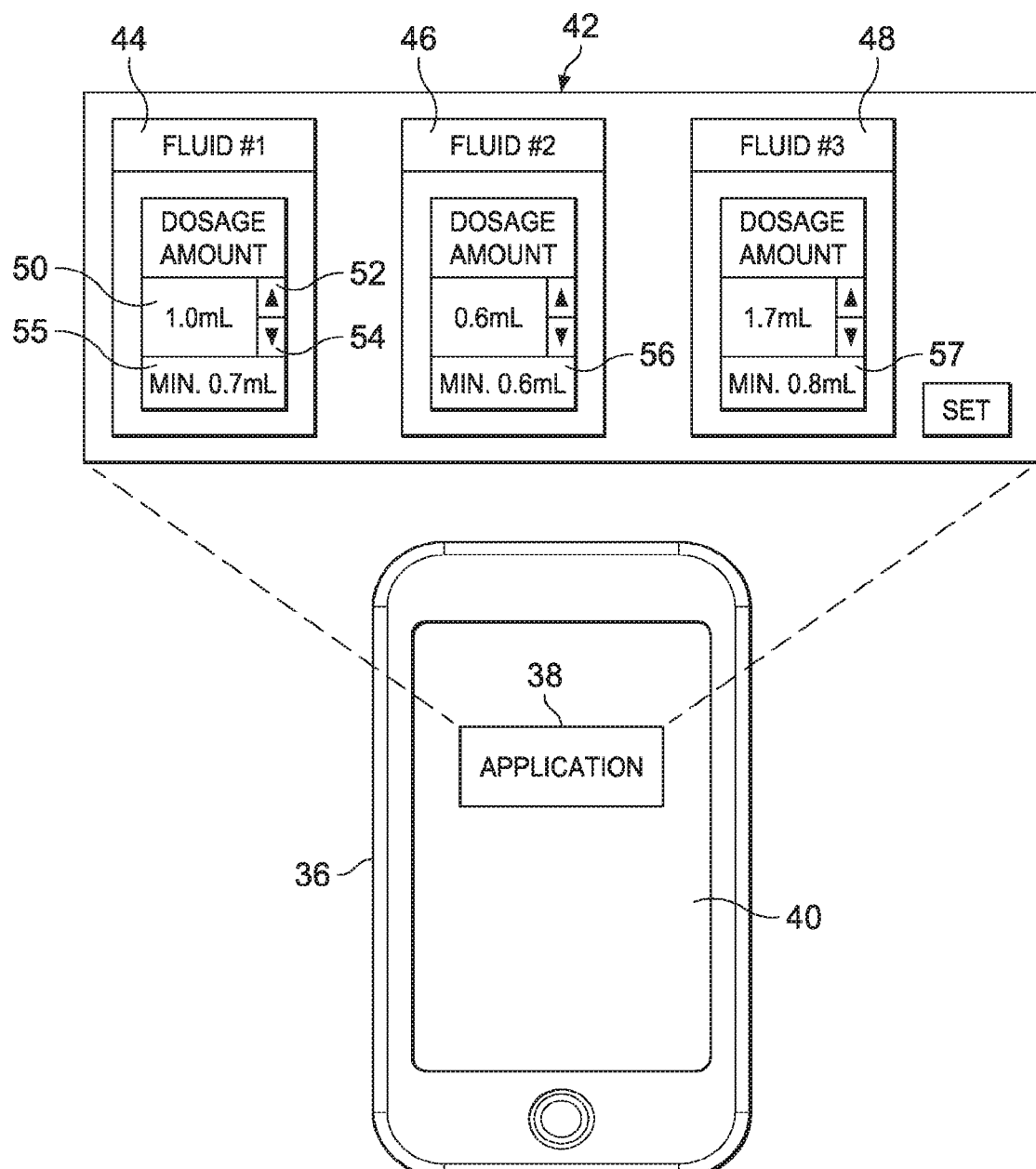
FIG. 4 is a diagram depicting example features of a selection screen depicted on a display screen of a smartphone.

The dosage amount of the fluid dispenser 10 can be programmed using a smartphone 36 (shown in FIG. 4) or any of a variety of suitable alternative mobile or remote electronic devices, such as, for example, a tablet, a handheld computer, a laptop, or a personal computer. As illustrated in FIG. 4, the smartphone 36 can include an application ("app") 38 that facilitates programming of the dosage amount for the fluid dispenser 10. In one example, an app can be an application executing on the smartphone 36, for example an app available for downloading onto and executing on an Apple™ iPhone™ from the Apple™ iStore™.

The app 38 can be configured to permit a user (e.g., a custodian, maintenance personnel, etc.) to select the dosage amount for a variety of different fluid types that might be stored in the fluid dispenser 10. As illustrated in FIG. 4, when a user activates the app 38, such as by contacting a display screen 40 with a finger or a stylus, a selection screen 42 can be presented on the display screen 40. The selection screen 42 can display a dosage selection field 44 for a first fluid type ("Fluid #1"), a dosage selection field 46 for a second fluid type ("Fluid #2"), and a dosage selection field 48 for a third fluid type ("Fluid #3"). A dosage setting for the first fluid type can be input into the smartphone 36 by either manually entering the dosage amount into a numerical field 50 or by using the arrows 52, 54 to increase/decrease the displayed amount. The dosage settings for the other fluid types can be similarly assigned within their respective dosage selection fields 46, 48. Once the dosage settings have been entered, the user can activate a "SET" button to save the dosage settings to a memory module (not shown) of the smartphone 36. As will be described in more detail below, the smartphone 36 can then transmit at least one of the dosage settings to the fluid dispenser 10 to control the dosage amount of the fluid dispensed therefrom. It is to be appreciated that the different fluid types available to the app 38 can be retrieved from any of a variety of data sources, such as, for example, an online database, an onboard database (e.g., stored in the memory module), or a user defined list.

Still referring to FIG. 4, each of the dosage selection fields 44, 46, 48 are shown to include respective minimum value fields 55, 56, 57 that indicate the minimum permitted dosage amount for each of the first, second, and third fluids. In some embodiments, the minimum permitted dosage amounts can be obtained from a data source (e.g., an online database), while in other embodiments, the minimum permitted dosage amount can be manually entered/adjusted by the user (e.g., by activating the appropriate minimum value field 55, 56, 57 to display an entry field (not shown)). Manual entry/adjustment of the minimum permitted dosage amounts can be password protected to ensure that unauthorized individuals are not able to change the minimum permitted dosage amounts. This feature could be particularly helpful in a healthcare setting where the minimum permitted dosage amounts can correlate to the minimum efficacious dose of fluid and thus should only be able to be changed by authorized personnel (e.g., infection control practitioners).

Figure 5:
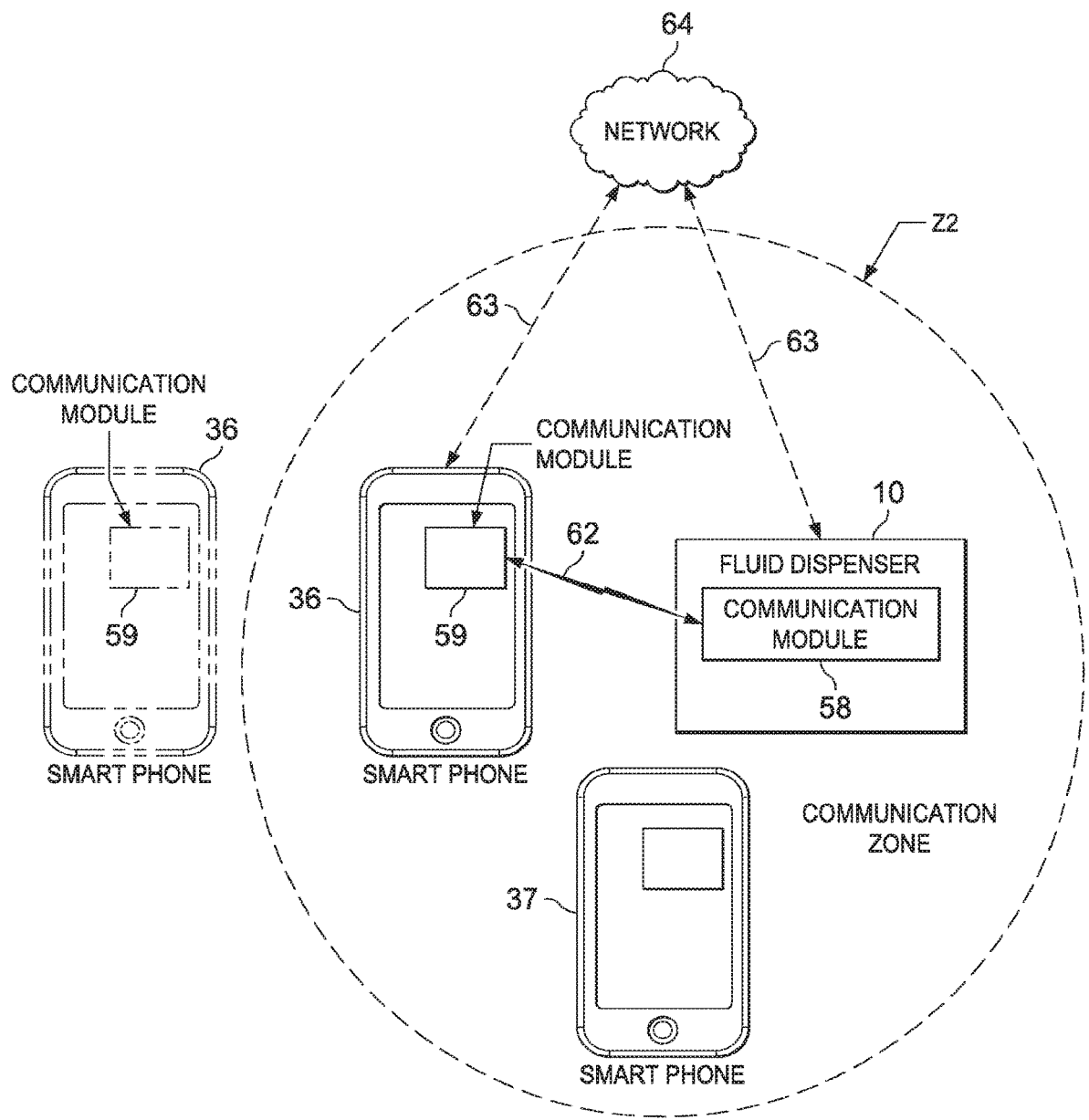
FIG. 5 is a schematic view depicting the fluid dispenser of FIG. 1 in association with the smartphone of FIG. 4, with the smartphone being shown in solid lines and dashed lines relative to a detection zone.
Figure 6:
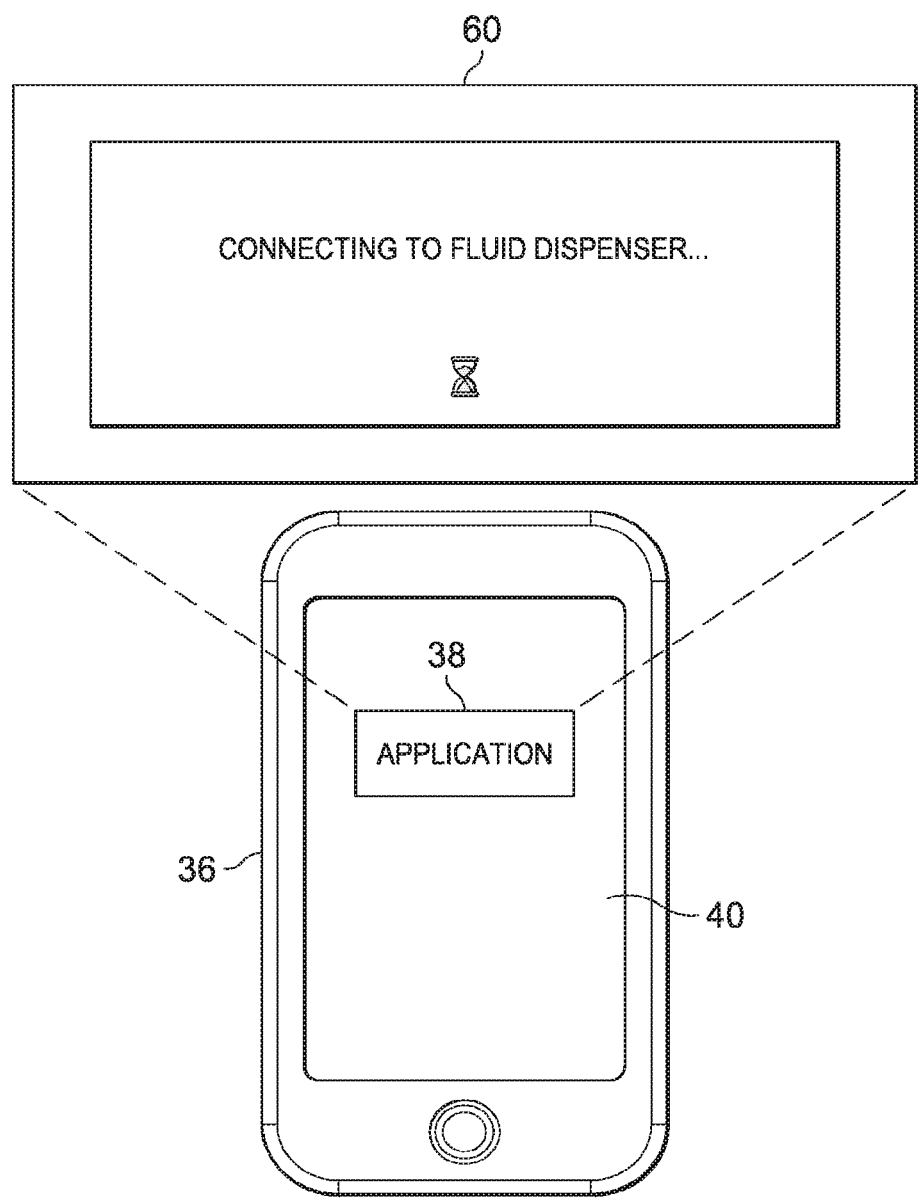
FIG. 6 is a diagram depicting example features of a splash screen depicted on the display screen of the smartphone of FIG. 4.

Referring now to FIG. 5, the fluid dispenser 10 and the smartphone 36 can include respective communication modules 58, 59 that facilitate communication between the fluid dispenser 10 and the smartphone 36. The communication modules 58, 59 can be configured to enable communication via any of a variety of wired and wireless protocols/standards, such as, for example, IEEE 802.11 and/or near field communication (NFC) standards (e.g., ISO/IEC 18000-3). The communication module 59 of the fluid dispenser 10 can define a communication zone Z2 and can detect entry of the smartphone 36 into the communication zone Z2 (e.g., a detection zone). When the smartphone 36 is out of the communication zone Z2, as shown with the smartphone 36 in dashed lines, the fluid dispenser 10 and the smartphone 36 are not in communication. However, once the smartphone 36 enters the communication zone Z2, the fluid dispenser 10 and the smartphone 36 can automatically establish a communication link such that the fluid dispenser 10 and the smartphone 36 are in communication with each other. In one embodiment, as illustrated in FIG. 6, the display screen 40 of the smartphone 36 can display a splash screen 60 indicating that the communication link is being established.

If multiple smartphones are within the communication zone Z2, as illustrated by smartphones 36 and 37 in FIG. 5, the fluid dispenser 10 can select one of the smartphones with which to establish a communication link. In one embodiment, the fluid dispenser 10 can select the most proximate smartphone through Received Signal Strength Indication (RSSI) or any of a variety of suitable alternative methods. In another embodiment, the fluid dispenser 10 can select one of the smartphones based upon the status of the user (e.g., physician vs. patient). It is to be appreciated that a fluid dispenser can detect a nearby smartphone according to any of a variety of suitable alternative methods, such as, for example, by detecting motion of a user associated with a smartphone.

In one embodiment, the fluid dispenser 10 and the smartphone 36 can establish a direct communication link with each other (e.g., as shown by solid arrow 62 in FIG. 5) such as, for example, Bluetooth, NFC, or any other type of communication link that does not involve an external network (WAN/LAN). In another embodiment, the fluid dispenser 10 and the smartphone 36 can establish an indirect communication link (e.g., as shown by dashed arrows 63 in FIG. 5) with each other via an external network (e.g., 64 in FIG. 5). In such an embodiment, a separate wireless device (not shown), such as a wireless router, for example, can define the communication zone Z2 and can detect entry of the smartphone 36 into the communication zone Z2 (e.g., the detection zone).

Once the fluid dispenser 10 and smartphone 36 have established a communication link, the smartphone 36 can detect the type of fluid stored or contained in the fluid container 20. In one embodiment, the smartphone 36 can transmit an interrogation signal to the fluid dispenser 10 requesting information about the fluid stored therein. The fluid dispenser 10 can then respond to the interrogation signal by transmitting, to the smartphone 36, identification of the type of fluid stored in the fluid container 20. It is to be appreciated that the fluid dispenser 10 can identify the type of fluid stored in the fluid container 20 from a barcode affixed to the fluid container 20, from an installer (e.g., through manual entry at a keypad (not shown)), from an RFID chip, or any of a variety of suitable alternative sources.

Once the smartphone 36 has detected the type of fluid in the fluid dispenser 10, the dosage setting for the fluid type can be retrieved from the memory module (not shown) and transmitted to the fluid dispenser 10. The fluid dispenser 10 can then adjust the dosage amount for the fluid based upon the dosage setting received from the smartphone 36. Referring to FIG. 4 as an example, if the smartphone 36 detects that the type of fluid stored in the fluid container 20 is Fluid #1, the smartphone 36 can transmit a dosage setting of 1.0 mL to the fluid dispenser 10. If the smartphone 36 detects that the type of fluid stored in the fluid container 20 is Fluid #2, the smartphone 36 can transmit a dosage setting of 0.6 mL to the fluid dispenser 10. If the smartphone 36 detects that the type of fluid stored in the fluid container 20 is Fluid #3, the smartphone 36 can transmit a dosage setting of 1.7 mL to the fluid dispenser 10.

Figure 7:
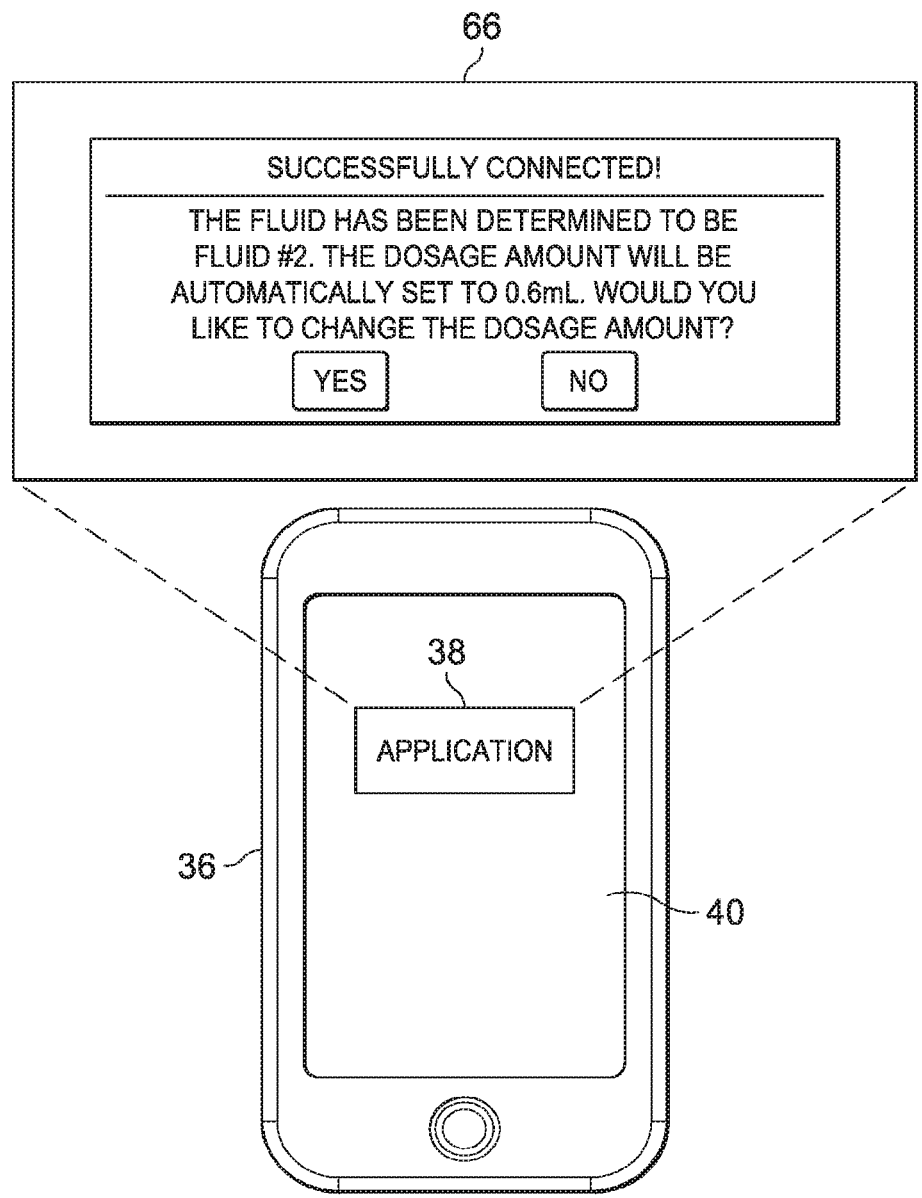
FIG. 7 is a diagram depicting example features of a query screen depicted on the display screen of the smartphone of FIG. 4.

In one embodiment, after detection of the fluid type but prior to transmission of the dosage setting to the fluid dispenser 10, the smartphone 36 can provide the user an opportunity to change the current dosage setting. For example, as illustrated in FIG. 7, the display screen 40 of the smartphone 36 can display a query screen 66 informing the user of the detected fluid type (e.g., Fluid #2) and the current dosage amount, and can give the user the opportunity to change the dosage amount before it is transmitted to the fluid dispenser 10 (e.g., via "YES" and "NO" buttons). If the user activates the "NO" button, the current dosage setting is transmitted to the fluid dispenser 10. If the user activates the "yes" button to change the dosage setting, the selection screen 42 illustrated in FIG. 4 can be presented to the user.

Figure 8:
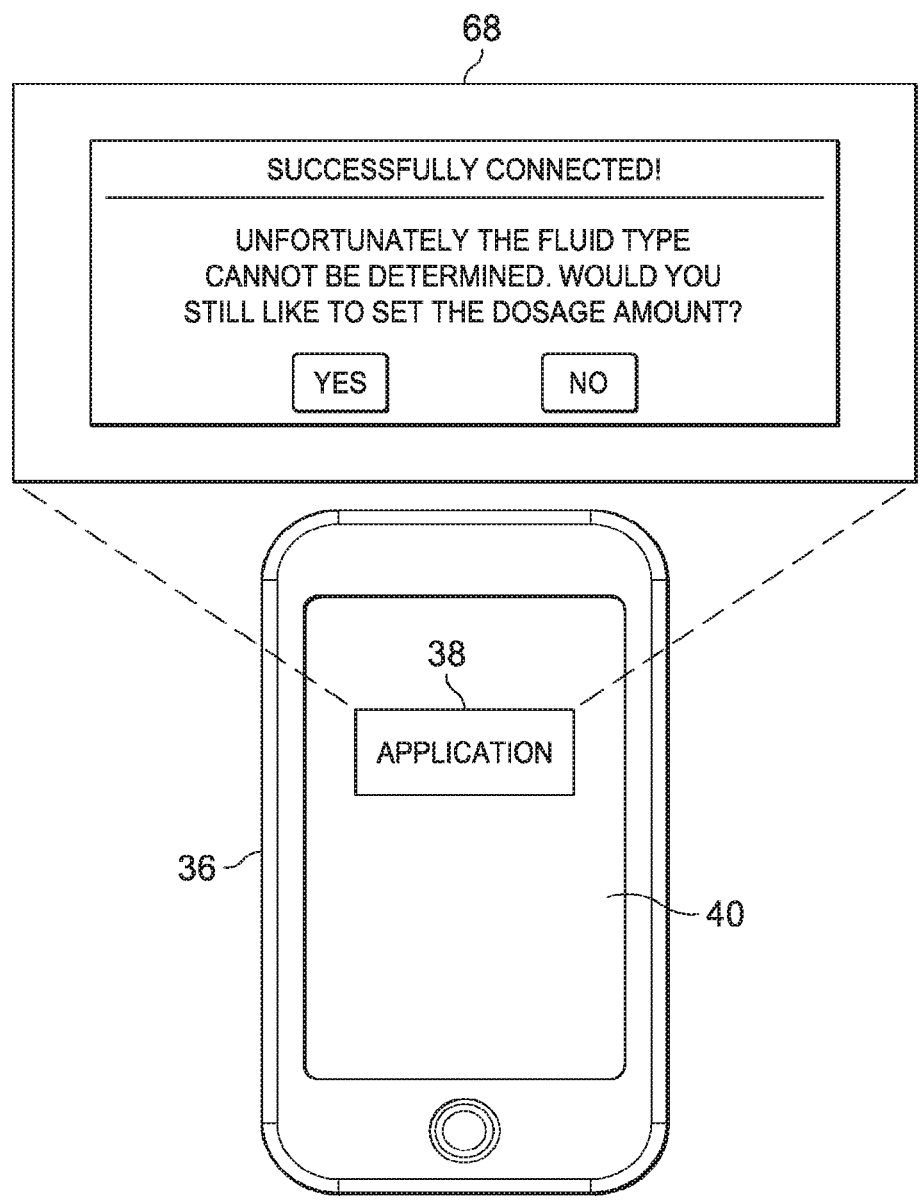
FIG. 8 is a diagram depicting example features of another query screen depicted on the display screen of the smartphone of FIG. 4.

If the detected fluid type from the fluid dispenser 10 is not recognized by the smartphone 36 (e.g., the fluid type does not match any of the fluid types retrieved by the smartphone 36 from the data source), the smartphone 36 can still give the user the opportunity to select the dosage amount for the fluid dispenser 10. For example, as illustrated in FIG. 8, the display screen 40 of the smartphone 36 can display a query screen 68 that informs the user that the fluid type was not recognized and can give the user the opportunity to still select the dosage amount (e.g., via "YES" and "NO" buttons). If the user activates the "NO" button, the current dosage setting (e.g., a default dosage setting) of the fluid dispenser 10 can be maintained. If the user activates the "YES" button, a selection screen (not shown) can be presented to the user to select the dosage amount.

Although fluid-specific dosage settings are described above, it is to be appreciated that any of a variety of suitable alternative fluid-specific settings of the fluid dispenser 10 can be controlled from the smartphone 36, such as, for example, a composition of the fluid (e.g., for fluid dispensers that mix the composition onboard the fluid dispenser), temperature, air content (e.g., for foamed fluids), color, fragrance, and/or grittiness (e.g., for solvent-based soil removing cleaners).

The figures and accompanying detailed description generally describe an application, or "app," that includes computer executable instructions capable of executing on a computing platform such as a desktop, laptop, tablet, mobile computing device, or other suitable hardware. The app can include software modules, processes, application programming interfaces or APIs, drivers, helper applications such as plug-ins, databases such as search and query databases, and other types of software modules or computer programming as would be understood in the art.

The smartphone 36 can include a processor (not shown) that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic device (PLD), and a field programmable gate array (FPGA), among others. The smartphone 36 can include or otherwise facilitate various other computing resources such as, for example, distributed computing devices, cloud computing resources, and virtual computing resources in general.

The memory module(s) of the smartphone 36 can be, for example, read only memory (ROM), random access memory (RAM), cache memory associated with the processor (not shown), or other memories such as dynamic RAM (DRAM), static ram (SRAM), flash memory, a removable memory card or disk, a solid state drive, and so forth. The smartphone 36, or other computing device, can include storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor (not shown) are also contemplated as storage devices.

The smartphone 36, or other computing device, can include network and communication interfaces that allow communication with other devices across a network. The network and communication interfaces can be an Ethernet interface, a radio interface, a telephony interface, a Universal Serial Bus (USB) interface, or any other suitable communications interface. Example communication interfaces can include wired data transmission links such as Ethernet and TCP/IP, as well as PSTN communications links such as T1s (or better), integrated services digital network (ISDN), Digital Subscriber Line (DSL), or dialup modems that implement, for example, the point-to-point protocol (PPP). The communication interface can include wireless protocols for interfacing with private or public networks. For example, the network and communication interfaces and protocols can include interfaces for communicating with private wireless networks such as a WiFi network, one of the IEEE 802.11x family of networks, or another suitable wireless network. The network and communication interfaces can include interfaces and protocols for communicating with public wireless networks, using for example wireless protocols used by cellular network providers, including Code Division Multiple Access (CDMA) and Global System for Mobile Communications (GSM). A smartphone 36 can use network and communication interfaces to communicate with hardware modules such as a database or data store, or one or more servers or other networked computing resources. Data can be encrypted or protected from unauthorized access.

In various configurations, the smartphone 36, or other computing device, can include a system bus for interconnecting various components, and/or can be integrated into one or more chips such as a programmable logic device or application specific integrated circuit (ASIC). The system bus can include a memory controller, a local bus, or a peripheral bus for supporting input and output devices, or communication interfaces. Example input and output devices include keyboards, keypads, gesture or graphical input devices, motion input devices, touchscreen interfaces, displays, audio units, voice recognition units, vibratory devices, computer mice, and any other suitable user interface.

The processor and memory module(s) can include non-volatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order.

What is claimed is:

1. A method for operating a fluid dispenser having a dispensation port, the method comprising:
receiving a fluid into the fluid dispenser for selective dispensation from the dispensation port;
detecting motion of a first user;
detecting a presence of a first remote electronic device associated with the first user in response to detecting motion of the first user;
determining a fluid type of the fluid stored within the fluid dispenser;
receiving, by the fluid dispenser and from the first remote electronic device, a first fluid specific setting for the fluid, wherein the first fluid specific setting for the fluid is set as a function of the fluid type; and
dispensing, by the fluid dispenser, a first amount of the fluid from the fluid dispenser based upon the first fluid specific setting.

2. The method of claim 1, wherein:
the fluid is stored in a fluid container housed in the fluid dispenser, and determining the fluid type of the fluid stored within the fluid dispenser comprises:
identifying the fluid type based upon a code affixed to the fluid container.

3. The method of claim 1, wherein:
the fluid is stored in a fluid container housed in the fluid dispenser, and determining the fluid type of the fluid stored within the fluid dispenser comprises:
identifying the fluid type based upon a radio frequency identification chip affixed to the fluid container.

4. The method of claim 1, wherein receiving the first fluid specific setting comprises receiving the first fluid specific setting directly from the first remote electronic device.

5. The method of claim 1, wherein receiving the first fluid specific setting comprises receiving the first fluid specific setting through a second device in communication with both the first remote electronic device and the fluid dispenser.

6. A method for operating a fluid dispenser having a dispensation port, the method comprising:
receiving a fluid into the fluid dispenser for selective dispensation from the dispensation port;
detecting a presence of a first remote electronic device within a predefined zone surrounding the fluid dispenser;
determining a fluid type of the fluid stored within the fluid dispenser;
receiving, by the fluid dispenser and from the first remote electronic device, a first fluid specific setting for the fluid, wherein the first fluid specific setting for the fluid is set as a function of the fluid type; and
dispensing, by the fluid dispenser, a first amount of the fluid from the fluid dispenser based upon the first fluid specific setting.

7. The method of claim 6, wherein:
the fluid is stored in a fluid container housed in the fluid dispenser, and determining the fluid type of the fluid stored within the fluid dispenser comprises:
identifying the fluid type based upon a code affixed to the fluid container.

8. The method of claim 6, wherein:
the fluid is stored in a fluid container housed in the fluid dispenser, and determining the fluid type of the fluid stored within the fluid dispenser comprises:
identifying the fluid type based upon a radio frequency identification chip affixed to the fluid container.

9. The method of claim 6, comprising:
detecting a presence of a second remote electronic device within the predefined zone;
determining a proximity of the first remote electronic device to the fluid dispenser and a proximity of the second remote electronic device to the fluid dispenser; and
enabling communication with the first remote electronic device when the proximity of the first remote electronic device to the fluid dispenser is less than the proximity of the second remote electronic device to the fluid dispenser.

10. The method of claim 9, comprising:
enabling communication with the second remote electronic device instead of the first remote electronic device when the proximity of the second remote electronic device to the fluid dispenser is less than the proximity of the first remote electronic device to the fluid dispenser.

11. The method of claim 9, wherein determining the proximity of the first remote electronic device to the fluid dispenser and the proximity of the second remote electronic device to the fluid dispenser comprises:
using receiving signal strength indication (RSSI) to determine the proximity of the first remote electronic device to the fluid dispenser and the proximity of the second remote electronic device to the fluid dispenser.

12. A method for operating a fluid dispenser having fluid stored therein, the method comprising:
detecting a presence of a first remote electronic device within a predefined zone surrounding the fluid dispenser;
transmitting, by the fluid dispenser to the first remote electronic device, information about the fluid dispenser, wherein the information about the fluid dispenser comprises a fluid type of the fluid stored within the fluid dispenser;
receiving, by the fluid dispenser and from the first remote electronic device, a parameter change request generated in response to the information; and
dispensing the fluid from the fluid dispenser according to a parameter of the fluid dispenser changed based upon the parameter change request.

13. The method of claim 12, comprising:
detecting motion of a first user, wherein:
the first remote electronic device is associated with the first user, and
detecting the presence of the first remote electronic device comprises detecting the presence of the first remote electronic device in response to detecting motion of the first user.

14. The method of claim 12, comprising:
receiving an interrogation signal from the first remote electronic device, wherein transmitting the information about the fluid dispenser comprises:
transmitting the information about the fluid dispenser in response to receiving the interrogation signal.

15. The method of claim 12, wherein the parameter change request comprises a request to set a dosage of the fluid dispensed in response to actuation requests.

16. The method of claim 12, comprising:
determining the fluid type of the fluid stored within the fluid dispenser prior to transmitting the information about the fluid dispenser.

17. The method of claim 16, wherein:
the fluid is stored in a fluid container housed in the fluid dispenser, and determining the fluid type of the fluid stored within the fluid dispenser comprises:
identifying the fluid type based upon a code affixed to the fluid container.

18. The method of claim 16, wherein:
the fluid is stored in a fluid container housed in the fluid dispenser, and determining the fluid type of the fluid stored within the fluid dispenser comprises:
identifying the fluid type based upon a radio frequency identification chip affixed to the fluid container.

19. The method of claim 12, wherein the parameter change request comprises a request to set at least one of a composition of the fluid, a temperature of the fluid, an air content of the fluid, a color of the fluid, a fragrance of the fluid, or a grittiness of the fluid in response to actuation requests.

20. The method of claim 12, comprising:
determining a proximity of the first remote electronic device to the fluid dispenser.

* * * * *